United States Patent [19]
Gregory et al.

[11] Patent Number: 5,543,983
[45] Date of Patent: Aug. 6, 1996

[54] SERVO CONTROLLED LUBRICANT THICKNESS FOR NEAR MAGNETIC RECORDING

[75] Inventors: Thomas A. Gregory; James A. Hagan, both of, Rochester, Minn.; Christopher G. Keller, Albany, Calif.

[73] Assignee: International Business Machines Corporation, Armonk, N.Y.

[21] Appl. No.: 236,437

[22] Filed: May 2, 1994

Related U.S. Application Data

[63] Continuation of Ser. No. 998,701, Dec. 30, 1992, Pat. No. 5,309,301.

[51] Int. Cl.$^6$ ................................................ G11B 17/32
[52] U.S. Cl. ........................ 360/97.02; 360/97.03; 360/75
[58] Field of Search .................... 360/69, 137, 97.02, 360/128, 103, 135, 75, 102, 97.03

[56] References Cited

U.S. PATENT DOCUMENTS

| | | | |
|---|---|---|---|
| 5,138,506 | 8/1992 | Beck et al. | 360/97.02 X |
| 5,202,803 | 4/1993 | Albrecht et al. | 360/97.02 |
| 5,278,711 | 1/1994 | Gregory et al. | 360/103 |

FOREIGN PATENT DOCUMENTS 03120405  5/1991  Japan .

Primary Examiner—Aristotelis Psitos
Assistant Examiner—James L. Habermehl
Attorney, Agent, or Firm—Richard E. Billion

[57] ABSTRACT

The lubricant film for a near contact magnetic recording device is maintained by a closed loop servo control for a recirculating lubricant supply system. A reservoir closely overlies the disk data surface and includes a heater for controlling the temperature difference between the reservoir and the disk surface. Decreasing the heater current reduces the film thickness and increasing the heater current increases the film thickness. A wick system gathers lubricant from within the disk enclosure, which may have been spun off the disk or condensed from the lubricant laden atmosphere and returns the lubricant by capillary action to the reservoir. Further, the reservoir includes two portions which are independently controllable. The first overlies the data band of the disk and the second overlies the start/stop zone and the head when the latter is not operational and parked at the nonoperating location. The start/stop zone reservoir can be used to increase the localized film thickness when the head is coming to rest on the disk surface and during start-up to prevent wear between head and disk.

35 Claims, 5 Drawing Sheets

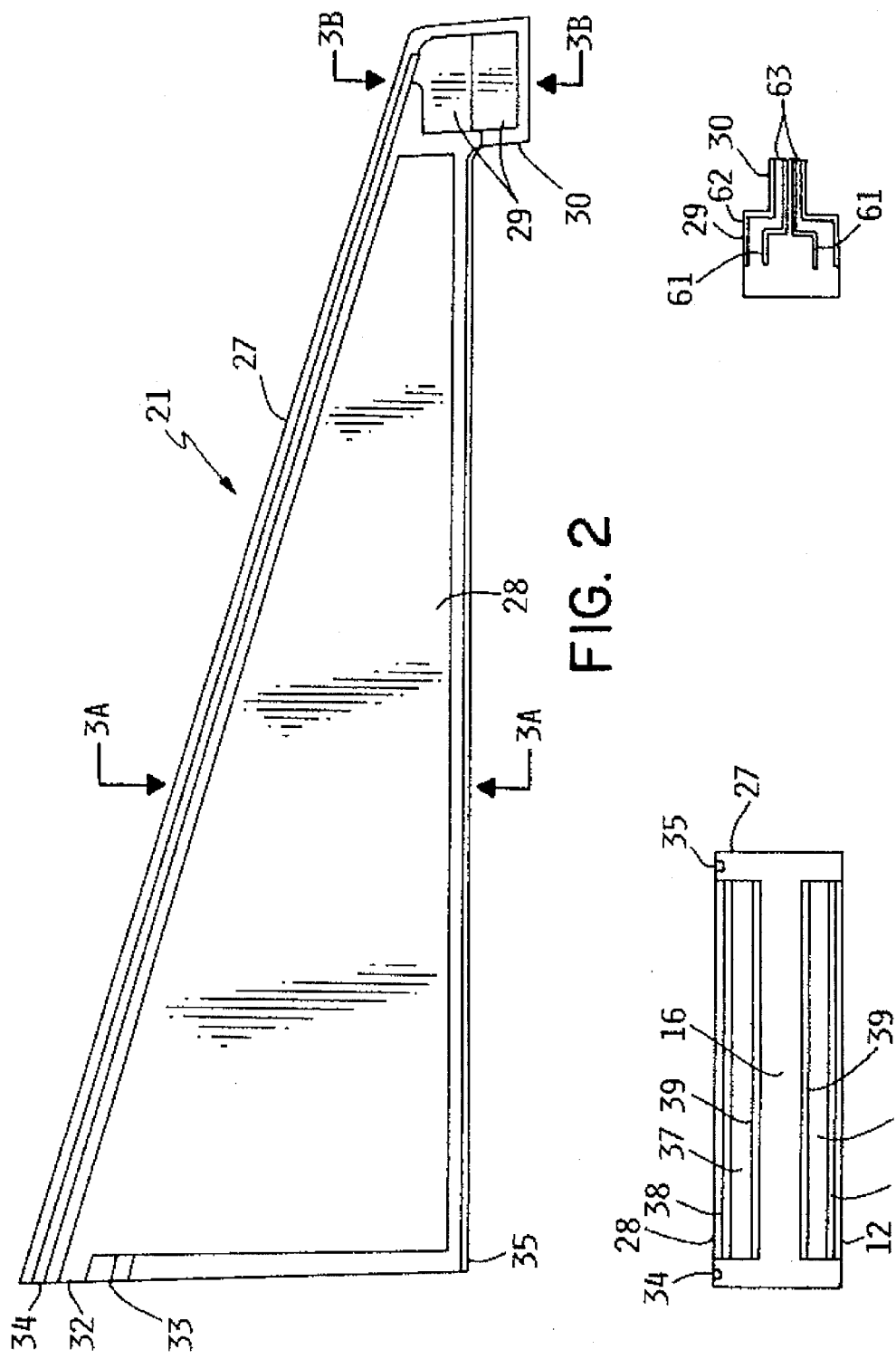

SERVO CONTROLLED LUBRICANT THICKNESS FOR NEAR MAGNETIC RECORDING

RELATED APPLICATION

This is a continuation application of U.S. patent application Ser. No. 07/998,701 filed Dec. 30, 1992, now U.S. Pat. No. 5,309,301 issued May 3, 1994.

FIELD OF THE INVENTION

This invention is directed to apparatus for magnetic recording of data on a rigid magnetic disk wherein the magnetic transducer head slides over a magnetic recording surface and is separated therefrom by a film of liquid lubricant. More particularly the present invention provides a closed loop control system for maintaining a desired lubricant film thickness on the data surface.

BACKGROUND

As head disk spacings become progressively smaller to enhance linear and areal recording densities it has been found that the use of a liquid bearing to replace the air bearing that separates the surfaces enables more reliable near contact operation. A problem that remains to be solved in near contact magnetic recording is how to maintain a uniform film of liquid lubricant between the head and disk at all times. If the separation of head and disk can be maintained with precision, high system reliability can be achieved.

If a hydrodynamic bearing is used, the sliding height will be a function of temperature since the lubricant viscosity is thermally dependent. This situation is not conducive to obtaining maximum recording densities wherein the read/write electronics are optimized for a constant head to disk spacing. A flooded hydrodynamic bearing also requires that a layer of lubricant much thicker than the actual head to disk spacing be applied to keep new lubricant flowing radially into the track being used. This results in more drag on the slider as excess lubricant must be pushed away from the load bearing feet (accelerated up to 10 to 20 meters per second). The pressures required for a hydrodynamic bearing to operate flooded in a liquid lubricant with a sliding height of only 50 angstroms are relatively high (greater than 1000 psi).

In a system that recirculates the liquid lubricant, the lubricant will dissolve plasticizers and other compounds from the file components and carry them to the disk. Since the disk is warmer than the cover of the file, evaporation occurs from the rapidly spinning thin film of lubricant covering the disk. The lubricant on the disk may become saturated with such dissolved compounds which may precipitate out and permit residues to build up on the disk if precautions are not taken.

A device using a slider that has a bearing area large enough to ski on top of the lubricant film will still have a sliding height that is viscosity dependent since the bearing surface penetrates the film slightly. In the current state of the art, the lubricant is supplied from the inner diameter of a disk from a one pass reservoir (not recirculated). Due to limited size, a suitable lubricant must be very viscous to minimize the spin-off rate. Presently no provision is made for controlling the thickness of the lubricant film which commonly varies from about 10 to 300 angstroms. This conditions may be adequate for current magnetic films and read/write channels, but ultimately uniform head spacing will be required.

Further, since the head displaces the lubricant from the track being used at a rate much greater than the resupply rate, a special user algorithm will likely be needed to keep the head from operating on any given track too long. Also it may be necessary to prohibit use of a reiterative seek pattern that might deplete lubricant On a band or given pattern of tracks.

Stiction is not a problem for low viscosity liquid bearing systems because the bearing pads are sufficiently small and the lubricant film is thick enough such that a meniscus does not form between the slider and the disk. It is the menisci having angstrom scale radii of curvature that creates the large, negative pressures which draw the normal air bearing slider into the disk with sufficient force to cause stiction.

SUMMARY OF THE INVENTION

In the lubricant control system of the present invention a wick system supplies a reservoir and extends to various locations within the head-disk enclosure where the lubricant spun off the rotating disk may collect. One branch of the wick structure extends to the coolest region of the enclosure. Capillary action keeps the reservoir continuously and uniformly nearly saturated with lubricant. The reservoir is fitted with a heating element. The thickness of the lubricant layer on the disk is controlled by the difference in temperatures of the reservoir and the disk. Thus, if the lubricant is too thick, it can be reduced by decreasing the current in the reservoir heating element. If the lubricant is too thin, it can be increased by raising the current in the heater.

There are several options that can be used to provide the feedback to the servo heater current to thereby maintain the desired lubricant thickness, such as 40 to 60 angstroms.

Using the system of the invention, distillation to the disk ensures lubricant purity on the disk. Nonvolatile components will not accumulate on the disks as can be the case for an unpurified wick system that contacts the disks. Because some of the applied lubricant will ultimately leave the surface via spin-off and evaporation, the disk is continually being supplied with distilled lubricant with high purity being assured. The shorter chain-length of the molecules comprising this lubricant system are not vulnerable to mechanical scission caused by the high shear-rate that can degrade larger molecules. The low viscosity of the lubricant allows flow to continually replenish high-usage tracks where the head would otherwise reduce the thickness of the lubricant film. Lubricant replenishment of the track being used will occur directly from the vapor phase. Sliding height can be independently controlled without affect by other file conditions such as temperature, radius of use and file attitude. This system can maintain a lubricant film of uniform thickness in the 50 to 100 angstrom range over the entire surface of the disk. It is also possible to provide a graded thickness by properly shaping the reservoir aperture and applied heater power.

BRIEF DESCRIPTION OF THE DRAWING

FIG. 2 is an enlarged view of the reservoir of FIG. 1.

FIG. 3A is a section view of the principal reservoir portion of FIG. 2.

FIG. 3B is a section view of the auxiliary reservoir portion of the device of FIG. 2.

DETAILED DESCRIPTION

Figure 1:
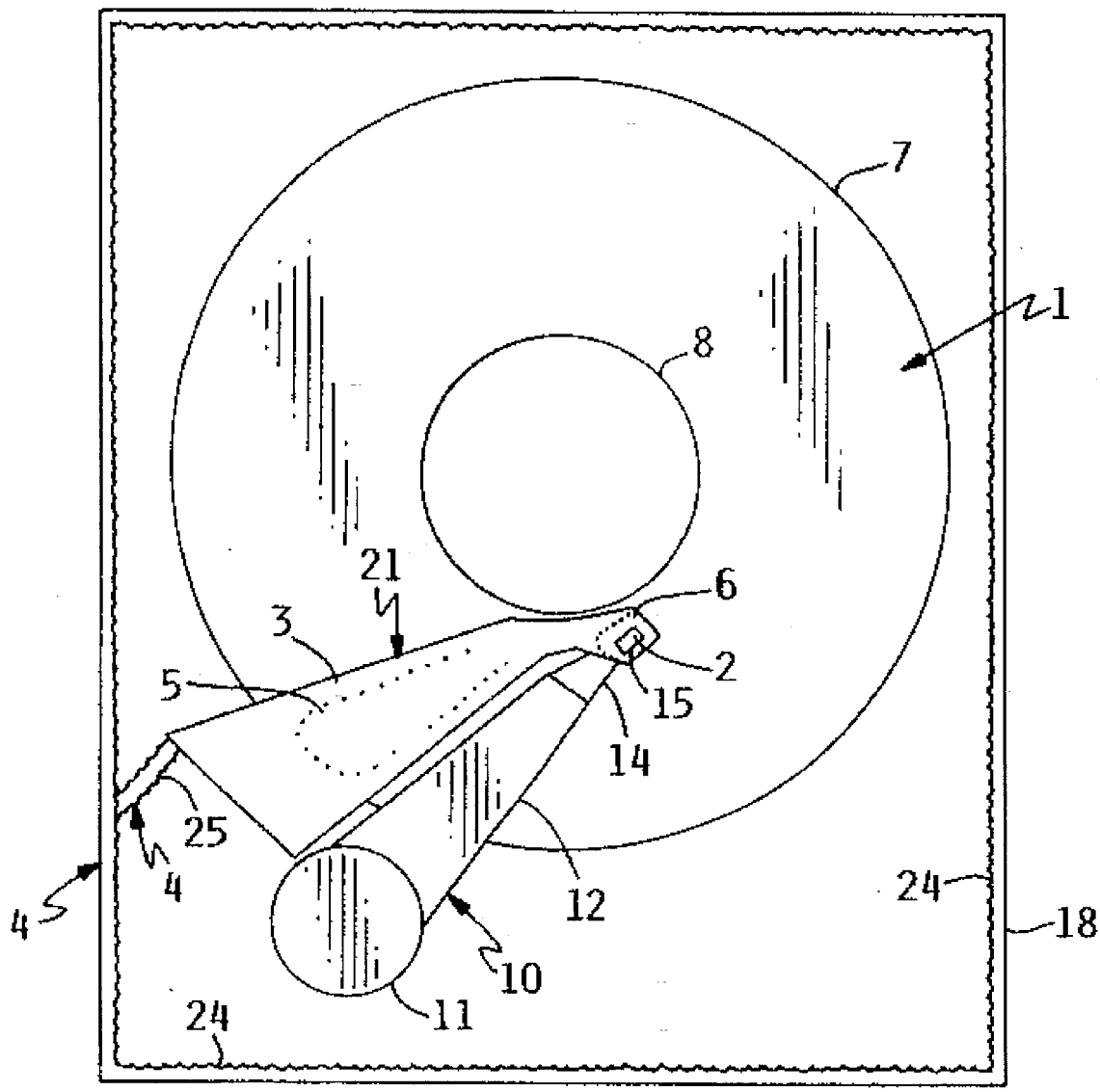
FIG. 1 is a plan view of a disk drive, with the cover removed, illustrating the recirculating reservoir system of the present invention.

FIG. 1 is a schematic showing of a disk drive including the reservoir system of the present invention. The disk 7 is mounted for rotation in unison with the hub 8. An actuator assembly 10 includes a hub 11 from which extends arm 12 that carries a flexible or resilient suspension 14 on which is mounted the transducer carrying slider or head 15. The actuator assembly 10 pivots about the axis of hub 11 to move the-transducer from one data track to another data track. A housing, including the wall portions 18, surrounds and substantially seals the actuator and disk assemblies to create an isolated environment surrounding the disk assembly. A reservoir assembly 21 extends across the disk surface 22 with active portions extending over the entire radial band of tracks used on the disk such that the entire area of the disk accessed by the slider passes beneath and in close proximity to an active reservoir surface during operation. Wick material 24 is disposed along the surface areas of the housing walls 18 to collect and return lubricant to the reservoir. Some lubricant is spun off the disk surface by the centrifugal force induced by disk rotation and other lubricant may be released through condensation of vapors which may occur when lubricant is vaporized at the reservoir and escapes condensation on the disk surface or is released through normal evaporation from the treated disk surface.

The reservoir is supplied by a wick 18 which extends to the various surfaces and recesses of the file enclosure where the low viscosity lubricant that is spun off from the disk or evaporated collects. One portion Of the wick structure is deliberately extended into the region of the enclosure that will be the coolest. A wick portion 25 connects the wick material 18 and the reservoir. Capillary action keeps the reservoir nearly saturated with lubricant at all times. The reservoir assembly includes a heating element. The thickness of the lubricant layer on the disk is controlled by the difference in the temperatures of the reservoir and the disk. Thus if the lubricant is too thick, the thickness can be reduced by decreasing the current supplied to the reservoir heating element. If the lubricant layer is too thin, thickness can be increased by increasing the current supplied to the heater.

FIG. 2 is a bottom view of the reservoir assembly 21, the side that confronts the disk surface. The reservoir assembly includes a ceramic substrate or enclosure 27 that is a thermal insulator. The structure will establish a uniform temperature throughout the lubricant on the reservoir assembly. The side of this structure facing the disk surface will emit lubricant vapors which will condense on the disk positioned not more than about 100 microns away. The shape of this structure and the shape of the heating element determine the molecular flux exiting the reservoir as a function of the disk radius. Thus, the molecular flux from the reservoir will radially increase toward the outside diameter, so as to satisfy the progressively larger annular area of the disk to which lubricant must be applied, and counter the commensurately higher rate of evaporation that will occur with increasing disk radius. The reservoir assembly 21 contains a principal reservoir member 28 that overlies the band of data tracks and an auxiliary reservoir portion 29 at the distal end. The auxiliary portion 29 overlies the start stop zone at the inner diameter of the disk 7 and includes an elevated region 30 which overlies the slider 15 when the slider is parked in the nonoperating position. A pair of high conductivity leads 32, 33 extend to the principal reservoir heater electrodes and a second pair of high conductivity leads 34, 35 extend to the auxiliary reservoir portion heating element. Thus the reservoir principal portion and auxiliary portion can be independently controlled.

A section of a portion of the reservoir is shown in FIG. 3A. The reservoir assembly includes a ceramic substrate 27 that has low thermal conductivity and low heat capacity overlies and surrounds the reservoir:element that confronts the disk surface. The heating element is in the form of a high electrical resistance layer 37 of material that produces heat when a current is passed through it. Layers of copper or other good conductor 38, 39 above and below the resistive layer provide upper and lower electrodes in electrical contact with the resistive layer 37. The reservoir layer is textured by machining or photoetching to enhance the ability to wick lubricant. This reservoir layer may be formed directly on the lower electrode layer or a thin porous or rough textured layer of a different material may be used. The auxiliary heater shown in FIG. 3B includes capillary layers 29, conductive layers 61 and 62, and resistance heater elements 63.

Figure 4:
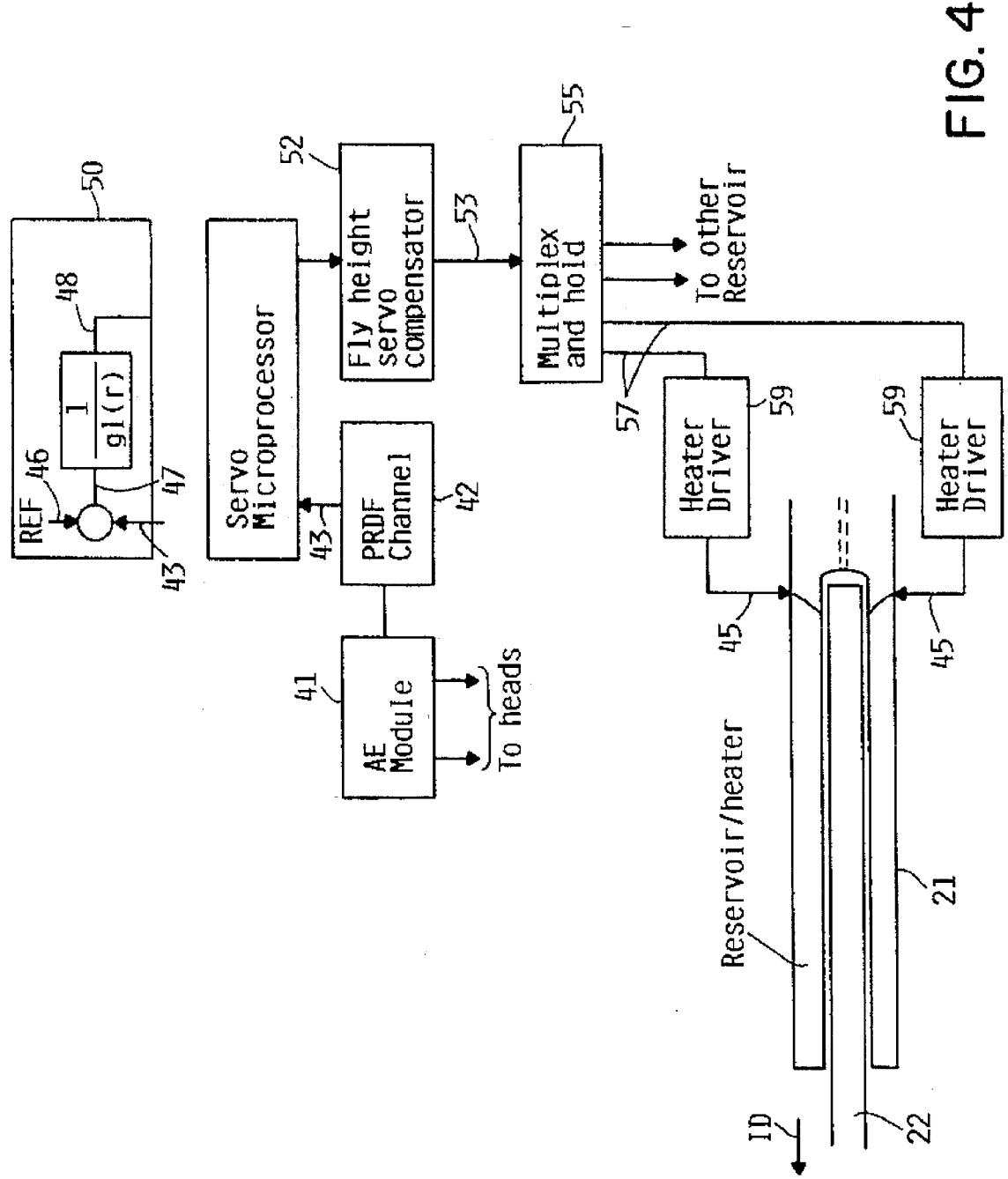
FIG. 4 is a block diagram of the closed loop control system of the invention using the output of a PRDF channel.

Referring to FIG. 4, the signal from the transducer of the selected head is received by the arm electronics (AE) module 41 and directed to the partial response digital filter (PRDF) module 42. The PRDF module has one or more outputs on line 43, which are v(d,r,h); that is, the voltage is proportional to the distance between the gap of the recording head 15 and the surface of the disk 22. This distance is the flyheight, designated as d. The signal v(d,r,h) is derived from certain recorded patterns interlaced with the customer data and is used for optimizing the data channel. The r and h in the argument of v(d,r,h) refer to radial position on the disk and the head number respectively (v is the voltage of the signal).

The lubricant film thickness can be controlled by mounting the lubricant reservoir assembly 21 in close proximity to the disk surface 22 and providing a closed loop control. A current or voltage on line 45 then allows the reservoir temperature to be altered which causes a change in the lubricant thickness on the disk surface 22 to ultimately vary the flyheight d. A particular closed loop flyheight control algorithm is:

$$v(d,r,h) = g1(r)\, g2(d,h)$$

where g1(r) is a predictable function describing signal amplitude as a function of linear bit density (a known function of radius r) and g2(d,h) is a linear function of d, but has a proportional constant that is unique to each head and is a function of many factors, like magnetic head efficiency, head bearing surface tolerances, suspension spring force tolerances, temperature, etc. The inverse of the function g1(r) may be stored as a function of radius r in table form in ROM or RAM in servo processor or as a simple inverse function that could be used to calculate 1/g1(r) in for a given radius.

In FIG. 4, signal v(d,r,h) for a particular head is fed on line 43 in digital form and subtracted from the reference signal v(d0,r,h) on line 46 where "d0" refers to the desired fixed flyheight. The difference, line 47, is multiplied by the inverse function "1/g1(r)", where r is known by the servo microprocessor 50. The output on line 48 is the digital flyheight error control signal. The flyheight error control signal is input to the flyheight (FH) servo compensator 52, which could be a proportional plus integral (PI) cascaded compensator. The output of compensator 52 on line 53 is sent to a multiplexer and hold device 55 that is also capable of storing a series of offsets as a function of radius for each head. During a seek no flyheight information is available because no data is coming through the data channel. In addition, head flyheight varies as a function of radial position due to head skew effects and linear velocity relative to the disk. Therefore, the multiplexer and hold device 55 would also have a feature that allows for a radius control or "r-control" line which would provide offsets as a function of radial position to compensate for repeatable flyheight variations. The offset as a function of radial position would be determined and used when no other flyheight information is available (such as during seek). The output lines 57 of the multiplexer and hold device 55 are each fed into a voltage or current driver 59. The purpose of the multiplexer is to send the control signal to the correct reservoir heater control circuit as data channel flyheight information is processed.

Figure 5:
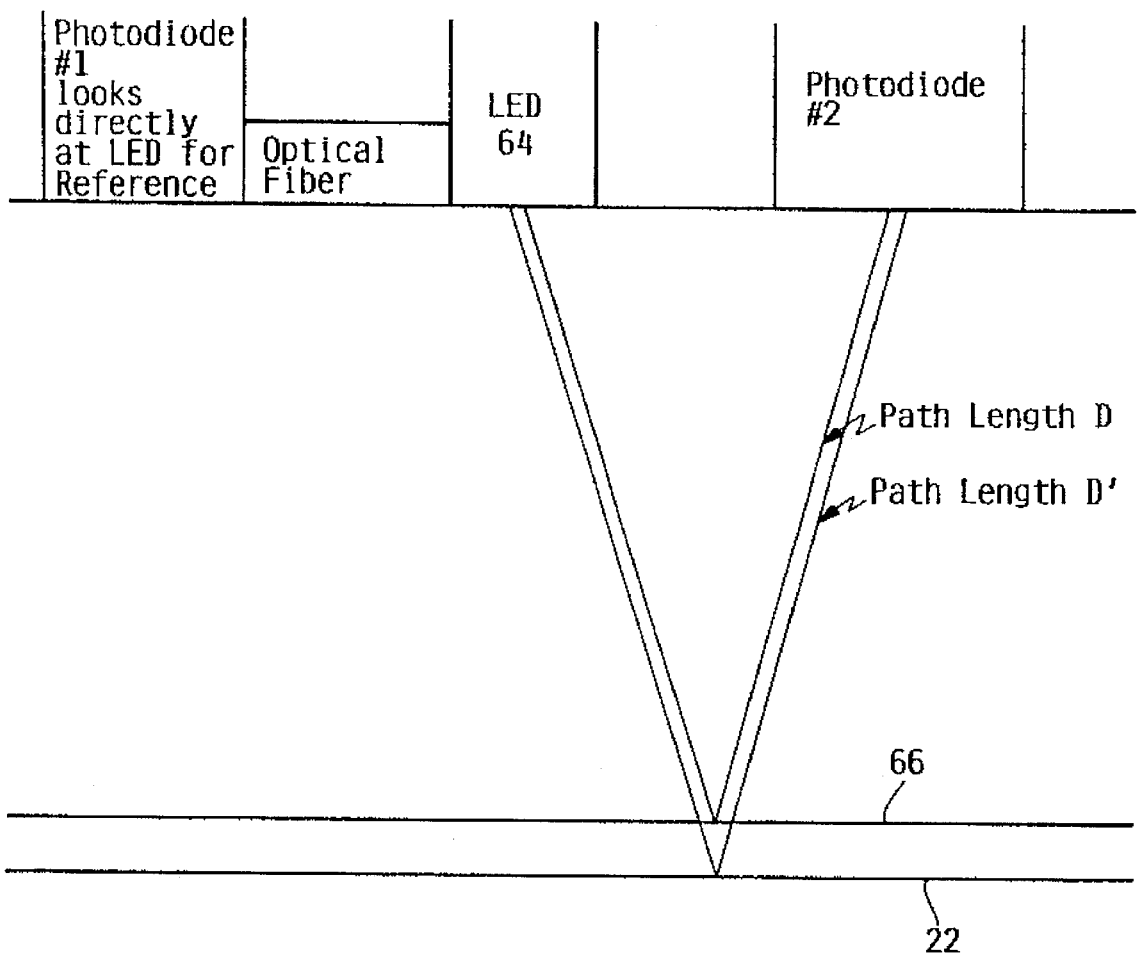
FIG. 5 is a schematic showing an optical sensing device for determining lubricant film thickness.

As illustrated in FIG. 5, an optical servo signal can be used to determine lubricant film thickness. A light emitting diode (LED) 64 emits photons toward the disk surface 22. Photons reflected from the lubricant surface 66 interfere with photons reflected from the metal disk surface. The carbon overcoat applied over the disk surface does not reflect a significant number of photons. As an example, a 50 angstrom lubricant film with an index of refraction of 1.5 on top of 50 angstroms of carbon with an index of 1.3 and with 6600 angstrom wavelength photons; the photons reflected from the lubricant surface 66 will be out of phase by 0.042 wavelengths with the photons reflected from the metal. With a photodiode comparator ratioing the LED output to the brightness reflected from the disk, a very high servo signal can be obtained. An increase in lubricant film thickness of 1 angstrom would decrease the reflected brightness by 0.07% which can be resolved by a detector.

Other approaches to lubricant film measurement would include making the slider and disk overcoat sufficiently conductive to permit a low-voltage electron leakage current applied through the lubricant to provide the servo signal.

The file should be hermetically sealed. The atmosphere enclosed should be inert (e.g., nitrogen or argon, no oxygen) and may be at low pressure (just slightly higher than the vapor pressure of the lubricant). The system can have a boundary lubricant component dissolved in the low viscosity vehicle. If this component has a lower vapor pressure than the liquid vehicle, then the reservoir will slowly accumulate more and more of this less volatile material as the vehicle evaporated from the reservoir at a faster rate than the boundary lubricant. There are two engineering options here. The reservoir can be loaded with a lifetime supply of the boundary lubricant (0.1 grams or less) at time of manufacture. This will simply evaporate slowly throughout file life at a rate sufficient to ensure maintenance of the absorbed boundary film on the disk, or,the boundary lubricant can be dissolved in the lubricant spread throughout the wicking material in the file. Then the concentration of this boundary lubricant in the vapor exiting the reservoir will steadily increase throughout file life as more of it is brought to the reservoir. In either case, the quantity of boundary lubricant needed is very small and would never be enough to completely fill up the reservoir. Thus, there is no danger of impeding the flow of the low viscosity vehicle.

Figure 6:
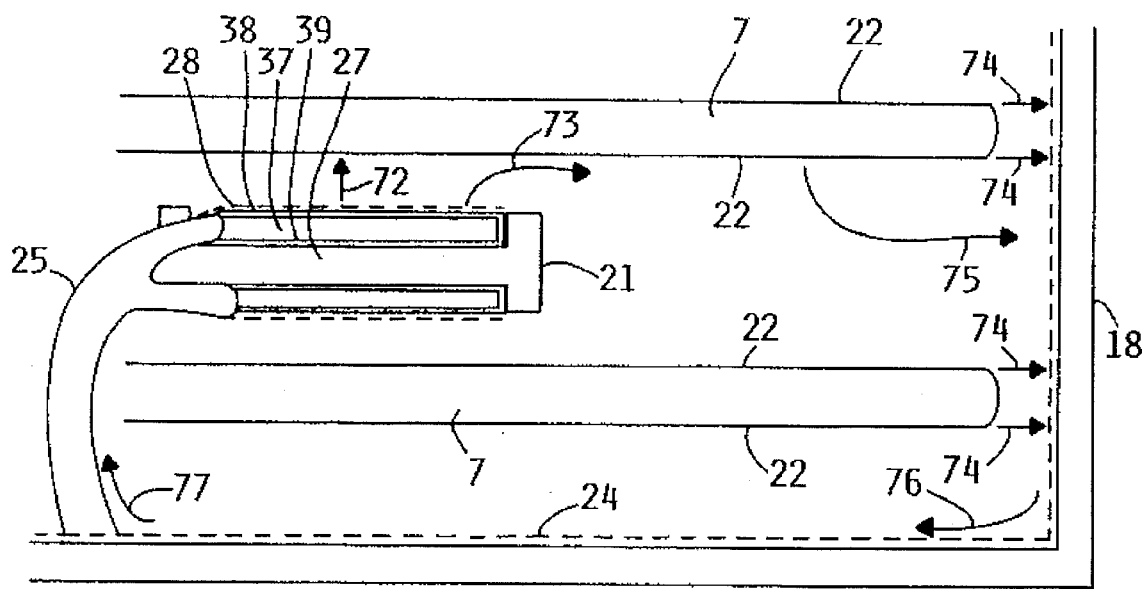
FIG. 6 is a schematic partial side elevation, partially broken away, of a disk drive including the closed loop recirculation system of the present invention showing the lubricant transfer.

FIG. 6 is a cross section through the stack of disks 7 and reservoir structure 21. FIG. 6 shows the principles of lubricant transport in the file. There is a net flow of lubricant vapors 72 from the heated reservoir 28 to the cooler disk surface 22. Some lubricant vapors 73 are also swept out of the reservoir without ever getting to the disk. Some lubricant molecules 75 evaporate from the disk. Some lubricant 74 is spun off as liquid droplets by centrifugal force. Lubricant molecules following pathways 73 and 75 condense on the file wall which is cooler than the disks. Momentum carries the droplets spun off (pathway 74) to the file wall 18. The entire interior of the file wall is lined with a capillary surface 24 (such as a roughened texture or porosity in the wall itself, or a fabric lining). This capillary structure ensures that lubricant distributes uniformly over the surface. The amount of lubricant in the disk drive is not enough to saturate the lining (i.e., it is not "dripping wet"). Thus, whenever lubricant adds to the lining at any point, whether by condensation or by spinoff, it is rapidly distributed in all directions throughout the lining. The wick 25 is also partially saturated with lubricant and contacts the lining 24. Lubricant flow 77 is driven by the capillary forces in the wick. The wick branches out and contacts each reservoir structure 21. The lubricant flows to the capillary surface 28 and spreads over it uniformly. A controlled electric current flows from electrode surface 38 through the resistive heating element 37, to electrode surface 39. The resulting heat causes a net flow of lubricant vapor to the disk, thus completing the recirculation cycle.

The best strategy for servo control of the lubricant thickness employs the electronics shown in FIG. 4, but any of these strategies allows the sliding height for each slider in the file to become programmable, independent of radius or temperature (viscosity effect). The system needs a reference measurement at a known sliding height. Deviations from this can then be monitored. Typically, as used today, the reference is taken at zero sliding height. This is not desirable for wear reasons, but it could be tolerated at infrequent intervals if necessary. A preferred method would be to measure the reference signals at the time of manufacture, and store the results in PROM. This means having a machine on the assembly line that measures lubricant thickness on the operating file by an independent method. With the lubricant thickness known to be right, the reference data can be taken. Now any deviations from this sliding height at any time in the future life of the file can be quantified.

By operating the bearing in the lubricant-limited regime, an increase in lubricant thickness results in an increase in sliding height. In this technology using a slider bearing with a low pitch angle, the load-supporting pressure is much lower than would be the case of a head operated at the same height but employing the technique of the lubricant-flooded regime. So the current proposal would allow control of the sliding height via the thickness of the lubricant film. The time constant for a change to this system is very short (the order of only milliseconds) in controlling angstrom sized deltas on a rapidly spinning volatile film. The response time of the reservoir can be made much shorter than would be perturbations that could influence lubricant film thickness on the disk. The rate at which the mass transfer of lubricant vapor can be changed over the short-term is mostly controlled by the temperature difference between the reservoir and the disk, and to a lesser extent, it is affected by the temperature difference between the disk and the file wall. Lubricant spin-off is another loss-channel that is small and negligible in consideration of short-term response.

The major thermal inertia influencing long-term mass transport in the system is related to the heat capacity at the file wall (regarding attainment of thermal steady-state conditions). The time constant for temperature change would be at least 2 orders of magnitude longer than for the reservoir unit. So the reservoir can easily adjust to transient variations as needed to maintain a well-controlled lubricant film thickness relative the major evaporation rate arising from the disk's surface during start-up through attainment of steady-state thermal conditions. Thus, the equilibrium lubricant thickness should always be maintainable to within a few angstroms of the desired value.

The interior disks in the stack will be surrounded by air that rotates with the stack. The top and bottom-most surfaces of the stack will have higher evaporation rates because they will not have saturated air rotating along with them. This can be remedied by adding a thin disk to the top and bottom of the stack to serve as a shield, or by not using the outermost surfaces for recording. Alternatively the outermost surfaces could be used, but would simply require more reservoir power than the other surfaces.

At steady state, the vapor flux from the reservoir unit must match the mass flux exiting the disk (the drain rate). The source is servo controlled to give the desired lubricant film thickness, but the ambient temperature will control the drain rate. For example, the power needed to maintain the thickness of a hexadecane film with a drain rate of 1 angstrom per disk revolution, at 6000 rpm, on a 95 mm disk is 0.013 watts. This magnitude is viable. A smaller disk would require less power.

Immediately above the head, when it is in the start/stop position, an auxiliary heater/wick branch is positioned. When the file power is interrupted, the motor leads are switched to this heater to use its rotational energy to power the heater. This process can supply enough lubricant to the start/stop track to increase the thickness to over 500 angstroms. So the head will not even contact the disk. By the time the spindle comes to rest, the head will still be settling into the thick film at an exponentially decreasing rate coming to rest several monolayers above the physical surface of the disk. Thus, no mechanical wear should occur after power shutoff.

To start the disk drive, current is first applied to the reservoir, and to the auxiliary heater before the motor starts. The reservoir unit lubricates the radial portion of disk it faces and, simultaneously, the auxiliary heater also applies a 500 angstrom film of lubricant to the head and the surrounding disk area. After approximately one second, the motor power is applied and the slider rises to the surface of this relatively thick lubricant film that is drawn under it by the rotation of the disk. With the start/stop track excessively lubricated, the spindle quickly achieves full speed and normal functioning then commences. Thus, dry head-to-disk contact will not occur, thereby preventing start-up wear.

We claim:

1. A disk drive assembly wherein a disk assembly and a transducer carrying actuator are surrounded by a housing and a lubricant film is maintained on the recording surfaces of the disk comprising sensing means for determining the thickness of the lubricant film on the disk recording surface, said sensing means located within the housing; and control means for closed loop control of the lubricant film thickness responsive to said sensing means.

2. The disk drive assembly of claim 1 wherein sensing means for determining the thickness of the lubricant film includes the read signal from said transducer.

3. The disk drive assembly of claim 1 wherein said sensing means include patterns placed on said disk and the read signal from said transducer as it passes over said patterns.

4. The disk drive assembly of claim 3 wherein the patterns placed on said disk are interlaced with data on said disk.

5. The disk drive assembly of claim 1 wherein the sensing means for determining the thickness of the lubricant film is an optical sensor.

6. The disk drive assembly of claim 5 wherein the optical sensor includes:

a source of light waves; and means for comparing the phase difference in light waves reflected from the disk.

7. The disk drive assembly of claim 6 wherein the source of light is a light emitting diode and the means for comparing phase is a photo diode comparator.

8. The disk drive assembly of claim 1 further comprising recirculating means for capturing lubricant that collects within said housing and returning said lubricant to said recording surface of said disk.

9. A disk drive assembly wherein a disk assembly and a transducer carrying actuator are surrounded by a housing and a lubricant film is maintained on the recording surfaces of the disk comprising sensing means for determining the thickness of the lubricant film on the disk recording surface, said sensing means located within the housing; and control means for controlling the lubricant film thickness determined by said sensing means wherein the actuator includes a slider which carries said transducer, and wherein the disk assembly has a overcoat applied to the surface of the disk wherein the sensing means includes means for passing a low-voltage current through said lubricant to provide a signal for determining the film thickness.

10. A magnetic disk drive wherein a disk assembly and a transducer carrying actuator assembly are surrounded by a housing and a lubricant film is maintained on the disk recording surfaces using a closed loop control comprising sensing means for determining the thickness of said lubricant film on said disk recording surface; and control means for regulating the thickness of said lubricant film determined by said sensing means.

11. The magnetic disk drive of claim 10 further comprising means for recirculating within said disk drive.

12. The disk drive assembly of claim 11 wherein sensing means for determining the thickness of the lubricant film includes the read signal from said transducer.

13. The disk drive assembly of claim 12 wherein the patterns placed on said disk are interlaced with data on said disk.

14. The disk drive assembly of claim 11 wherein said sensing means include patterns placed on said disk and the read signal from said transducer as it passes over said patterns.

15. The disk drive assembly of claim 13 wherein the sensing means for determining the thickness of the lubricant film is an optical sensor.

16. The disk drive assembly of claim 15 wherein the optical sensor includes:

a source of light waves; and means for comparing the phase difference in light waves reflected from the disk.

17. The disk drive assembly of claim 16 wherein the source of light is a light emitting diode and the means for comparing phase is a photo diode comparator.

18. A magnetic disk drive wherein a disk assembly and a transducer carrying actuator assembly are surrounded by a housing and a lubricant film is maintained on the disk recording surfaces using a closed loop control comprising sensing means for determining the thickness of said lubricant film on said disk recording surface;

control means for regulating the thickness of said lubricant film determined by said sensing means and means for recirculating within said disk drive, wherein the actuator includes a slider which carries said transducer, and wherein the disk assembly has a overcoat applied to the surface of the disk wherein the sensing means includes means for passing a low-voltage current through said lubricant to provide a signal for determining the film thickness.

19. A disk drive for storing data comprising:

a housing;

at least one disk rotatably attached to said housing;

a layer of lubricant placed on said at least one disk;

an actuator assembly further including:

a transducer; and means for passing the transducer in close proximity to the disk;

means for sensing the thickness of the lubricant on the surface of said at least one disk;

control means for regulating the thickness of the lubricant determined by said means for sensing; and recirculating means for capturing lubricant within said housing and returning said lubricant to the recording surface of said at least one disk.

20. A disk drive assembly wherein a disk assembly and a transducer carrying actuator are surrounded by a housing, said disk assembly having at least one disk and a lubricant, said lubricant including a lubricant film maintained on the recording surface of said at least one disk, said disk drive assembly comprising:

recirculating means for capturing lubricant within said housing and returning said lubricant to the recording surface of said at least one disk;

sensing means for determining the thickness of the lubricant film on the recording surface of said at least one disk; and control means for controlling the lubricant film thickness determined by said sensing means.

21. The disk drive assembly of claim 20 wherein sensing means for determining the thickness of the lubricant film includes the read signal from said transducer.

22. The disk drive assembly of claim 20 wherein said sensing means include patterns placed on said disk and the read signal from said transducer as it passes over said patterns.

23. The disk drive assembly of claim 22 wherein the patterns placed on said disk are interlaced with data on said disk.

24. The disk drive assembly of claim 20 wherein the sensing means for determining the thickness of the lubricant film is an optical sensor.

25. The disk drive assembly of claim 24 wherein the optical sensor includes:

a source of light waves; and means for comparing the phase difference in light waves reflected from the disk.

26. The disk drive assembly of claim 25 wherein the source of light is a light emitting diode and the means for comparing phase is a photo diode comparator.

27. The disk drive assembly of claim 20 wherein control means is a closed loop control.

28. The disk drive assembly of claim 20 further comprising:

a heater element for controlling the temperature of the lubricant in response to said control means for controlling the lubricant film thickness.

29. The disk drive assembly of claim 28 wherein sensing means for determining the thickness of the lubricant film includes the read signal from said transducer.

30. The disk drive assembly of claim 28 wherein said sensing means include patterns placed on said disk and the read signal from said transducer as it passes over said patterns.

31. The disk drive assembly of claim 30 wherein the patterns placed on said disk are interlaced with data on said disk.

32. The disk drive assembly of claim 28 wherein the sensing means for determining the thickness of the lubricant film is an optical sensor.

33. The disk drive assembly of claim 32 wherein the optical sensor includes:

a source of light waves; and means for comparing the phase difference in light waves reflected from the disk.

34. The disk drive assembly of claim 33 wherein the source of light is a light emitting diode and the means for comparing phase is a photo diode comparator.

35. The disk drive assembly of claim 28 wherein control means is a closed loop control.

\* \* \* \* \*